(12) United States Patent
Gaur et al.

(10) Patent No.: US 7,117,196 B2
(45) Date of Patent: Oct. 3, 2006

(54) METHOD AND SYSTEM FOR OPTIMIZING LEAF COMPARISONS FROM A TREE SEARCH

(75) Inventors: Santosh Prasad Gaur, Raleigh, NC (US); William Eric Hall, Clinton, CT (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 10/065,826

(22) Filed: Nov. 22, 2002

(65) Prior Publication Data

US 2004/0103083 A1 May 27, 2004

(51) Int. Cl.
*G06F 17/30* (2006.01)

(52) U.S. Cl. ............................... 707/2; 707/101; 707/6; 707/3

(58) Field of Classification Search ................ 707/100, 707/101, 102, 7, 6, 3
See application file for complete search history.

(56) References Cited

U.S. PATENT DOCUMENTS

| | | | | |
|---|---|---|---|---|
| 5,664,184 A | 9/1997 | Ferguson et al. | ........... | 395/614 |
| 5,781,772 A | 7/1998 | Wilkinson, III et al. | .... | 395/600 |
| 5,787,430 A | 7/1998 | Doeringer et al. | .......... | 707/100 |
| 5,829,004 A | 10/1998 | Au | ............................. | 707/100 |
| 6,029,170 A | 2/2000 | Garger et al. | ............... | 707/100 |
| 6,041,053 A | 3/2000 | Douceur et al. | ............ | 370/389 |
| 6,175,835 B1* | 1/2001 | Shadmon | .................... | 707/102 |
| 6,208,993 B1* | 3/2001 | Shadmon | .................... | 707/102 |
| 6,240,418 B1* | 5/2001 | Shadmon | .................... | 707/100 |
| 6,675,163 B1* | 1/2004 | Bass et al. | ..................... | 707/6 |
| 6,694,323 B1* | 2/2004 | Bumbulis | .................... | 707/101 |
| 6,826,568 B1* | 11/2004 | Bernstein et al. | ............. | 707/6 |
| 6,941,292 B1* | 9/2005 | Gaur et al. | .................... | 707/2 |
| 7,054,315 B1* | 5/2006 | Liao | ........................... | 370/392 |
| 2003/0009453 A1* | 1/2003 | Basso et al. | ................... | 707/3 |
| 2003/0120651 A1* | 6/2003 | Bernstein et al. | ............. | 707/6 |
| 2004/0103081 A1* | 5/2004 | Gaur et al. | .................... | 707/2 |
| 2004/0103083 A1* | 5/2004 | Gaur et al. | .................... | 707/3 |
| 2004/0236720 A1* | 11/2004 | Basso et al. | ................... | 707/1 |
| 2005/0177552 A1* | 8/2005 | Bass et al. | ..................... | 707/3 |

OTHER PUBLICATIONS

Sample et al., "Optimizing search strategies in K-d trees".*
Rao et al., "Cache conscious indexing for decision support in main memory", Columbia University technical report CUCS-019-98, Dec. 1, 1998.*
Kim et al., "Optimizing multidimensional index trees for main memory access", ACM, May 21-24, 2001.*
Martelli et al., "Optimizing decision trees through heuristically guided search", ACM, vol. 21, No. 12, Dec. 1978.*

* cited by examiner

*Primary Examiner*—Jean M. Corrielus
(74) *Attorney, Agent, or Firm*—Sawyer Law Group LLP

(57) ABSTRACT

Aspects for optimizing leaf comparisons from a tree search of data stored in external memory of an embedded processing system are described. The aspects include providing a control structure for leaf data comparisons as a control vector and a match key, and utilizing the control vector to direct types of comparison tests performed with the match key.

26 Claims, 5 Drawing Sheets

SM Leaf Control Block Format

|   | SM | LEAF | 2010b | |
|---|------|------|------|------|
| 0 |  |  |  |  |
| 1 | MMMM | MMMR | RLRL | MRLL |
| 2 | LLXX | XXXX | VAL | MSK |
| 3 | VAL | MSK | VAL | MSK |
| 4 | VAL | MSK | VAL | MSK |
| 5 | VAL | MSK | VAL | MSK |
| 6 | MIN | MAX | MIN | MAX |
| 7 | MIN | MAX | MIN | MAX |
| 8 | MIN | MAX | VAL | MSK |
| 9 | MIN | MAX | MIN | MAX |
| 10 | MIN | MAX | MIN | MAX |
| 11 | MIN | MAX | XXX | XXX |
| 12 | XXX | XXX | XXX | XXX |
| 13 | XXX | XXX | XXX | XXX |
| 14 | XXX | XXX | USER | DATA |
| 15 | < | USER | DATA | > |
|  | < |  |  | > |
| 29 | < | ∨ | ∨ | > |

2008 — row 6 (MIN/MAX)
2010a — row 7, row 8
2006 — row 2
2010b — top

FIG. 4

FM/LPM Leaf Control Block Format

|    | FM/LPM | LEAF |   |   |
|----|--------|------|------|------|
| 0  |  |  |  |  |
| 1  | LST(87) | VAL | VAL | VAL |
| 2  | VAL | VAL | VAL | VAL |
| 3  | VAL | VAL | VAL | VAL |
| 4  | XXX | XXX | XXX | XXX |
| 5  | XXX | XXX | XXX | XXX |
| 6  | XXX | XXX | XXX | XXX |
| 7  | XXX | USER | DATA | > |
|    | < |  |  | > |
| 14 | < | ∨ | ∨ | > |
| 15 | < | USER | DATA | > |
|    | < |  |  | > |
| 29 | < | ∨ | ∨ | > |

2020 — row 1

FIG. 5

METHOD AND SYSTEM FOR OPTIMIZING LEAF COMPARISONS FROM A TREE SEARCH

FIELD OF THE INVENTION

The present invention relates to control structures for tree searches in embedded processing systems.

BACKGROUND OF THE INVENTION

Processing system designers continually seek new ways to improve device performance. While processing speeds continue to increase, the latency imposed by memory access times imposes operating delays. In systems-on-a-chip/embedded systems, efforts to avoid such latency issues have included utilizing local memory in the form of SRAM (static random access memory) on-chip. However, cost and size limitations reduce the effectiveness of the use of SRAM on-chip for some processing environments.

For example, currently in network environments, network switches are being used to perform more complex operations than simple packet forwarding. Network processors are being developed to provide for more complex processing in network routers, while maintaining flexibility to accommodate changes and enhancements to the functionality provided by the routers, as techniques and protocols evolve. As with most any form of processors, these network processors also face challenges in terms of memory utilization, particularly due to the need to handle a vast array of network traffic.

In embedded processing systems, such as network processors, off-chip/external DRAM (dynamic random access memory) is an option that is often chosen due to its lower cost, as compared with SRAM. Thus, while potentially most cost effective, the use of external DRAM introduces a performance penalty in the form of longer access latency (additional delay cycles for the first request for data) relative to other types of RAM. Further, the problem of longer access latency is felt more sharply with shared DRAM, which needs to support concurrent operations required by the system, such as reading in new data from a DMU (data management unit) at the same time that a search for data in the memory is being performed.

In order to facilitate quicker storage and retrieval of data from the DRAM, a tree structure often is employed for the data being stored. For example, a typical tree structure may be from 12 levels to more than 23 levels deep. Such a large number of levels requires multiple requests to memory to obtain all of the necessary data, i.e., to access and utilize the desired leaf of the tree. In addition, with each successive level of the tree, there is more data (unsearched) than the previous level. These factors create further issues regarding how quickly traversal of a tree structure can occur.

Accordingly, what is needed is a system and method for optimization of a control structure for a leaf found from a tree search of data stored in external DRAM of an embedded processing system. The present invention addresses such a need.

BRIEF SUMMARY OF THE INVENTION

Aspects for optimizing leaf comparisons from a tree search of data stored in external memory of an embedded processing system are described. The aspects include providing a control structure for leaf data comparisons as a control vector and a match key, and utilizing the control vector to direct types of comparison tests performed with the match key.

With the present invention, a leaf data control structure is provided that achieves a straightforward and efficient approach for improving leaf comparison operations of a tree search engine. These and other advantages of the present invention will be more fully understood in conjunction with the following detailed description and accompanying drawings.

BRIEF DESCRIPTION OF THE SEVERAL VIEWS OF THE DRAWINGS

FIG. 4 illustrates a layout of the example leaf data control structure of FIG. 3 in a memory block.

FIG. 5 illustrates a layout of a leaf data control structure for FM/LPM algorithms in a memory block.

DETAILED DESCRIPTION OF THE INVENTION

The present invention relates to control structures for tree searches in embedded processing systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
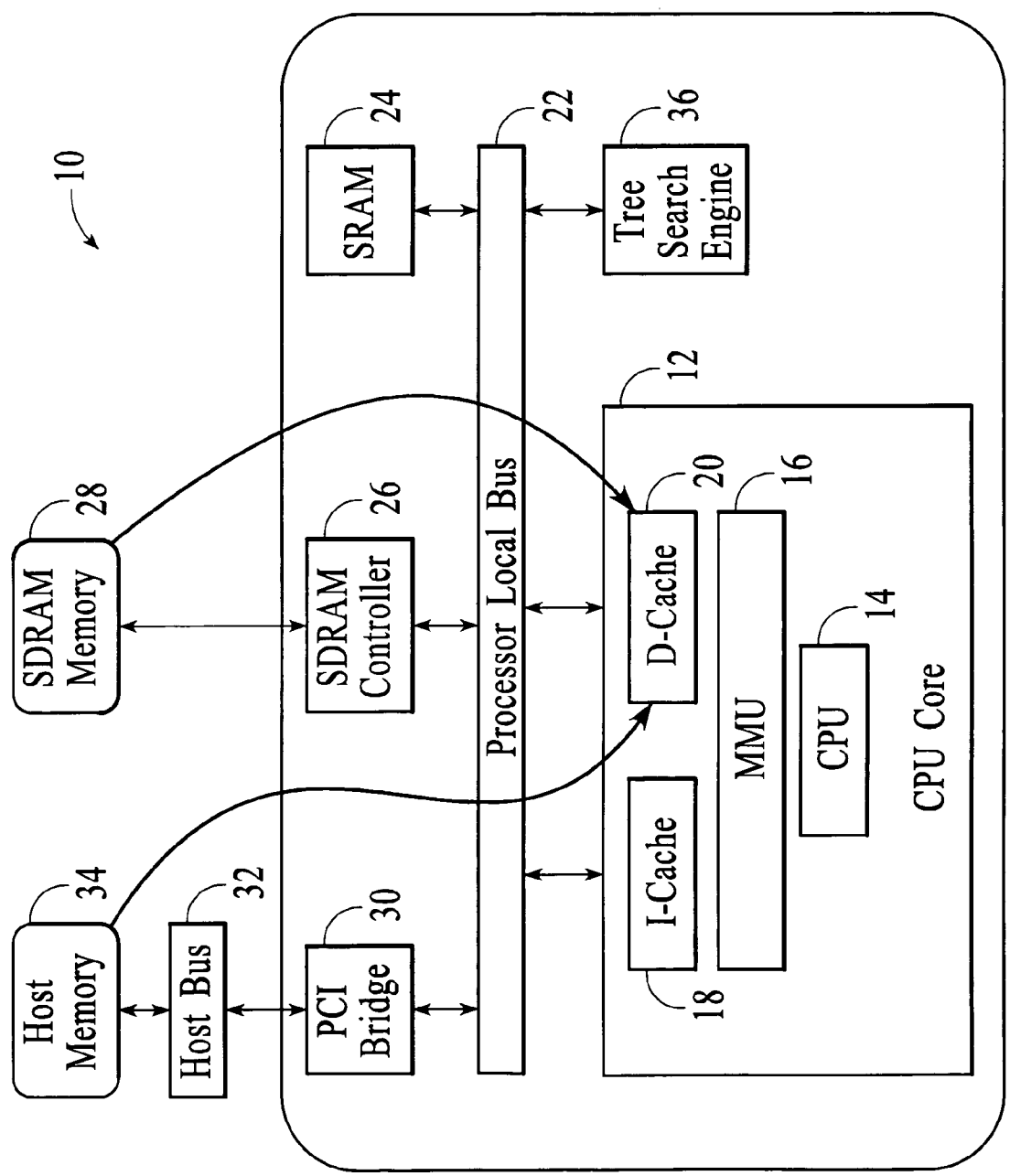
FIG. 1 illustrates an overall block diagram of an embedded processing system.

The present invention presents aspects of providing optimal performance in a processing system utilizing shared RAM memories for both data and control storage. An overall block diagram of an embedded processing system applicable for utilization of the present invention is illustrated in FIG. 1. As shown, the system 10 includes a central processing unit (CPU) core 12, the CPU core including a CPU 14, a memory management unit (MMU) 16, an instruction cache (I-cache) 18, and data cache (D-cache) 20, as is well appreciated by those skilled in the art. A processor local bus 22 couples the CPU core 12 to on-chip SRAM 24. Further coupled to the bus 22 is SDRAM (synchronous DRAM) controller 26, which is coupled to off-chip/external SDRAM 28. A PCI (peripheral component interconnect) bridge 30 is also coupled to bus 22, the PCI bridge 30 further coupled to a host bus 32 that is coupled to host memory 34. As shown, a tree search engine 36 is also included and coupled to bus 22. The tree search engine 36 is a hardware assist that performs pattern analysis through tree searches to find the address of a leaf page for read and write accesses in the SDRAM 28.

In accordance with the present invention, the searches performed by the tree search engine 36 are improved with the optimization of a control structure for a leaf found from a tree search of data stored in external DRAM 28 of an embedded processing system. In general, tree searches, retrievals, inserts, and deletes are performed according to a key. Information is stored in the tree in leaves, which contain the keys as a reference pattern. To locate a leaf, a search algorithm processes input parameters that include the key pattern, and then accesses a direct table (DT) to initiate the walking of the tree structure through pattern search control blocks (PSCBs). The searches occur based on a full match (FM) algorithm, a longest prefix match (LPM) algorithm, or a software management tree (SMT) algorithm.

Figure 2:
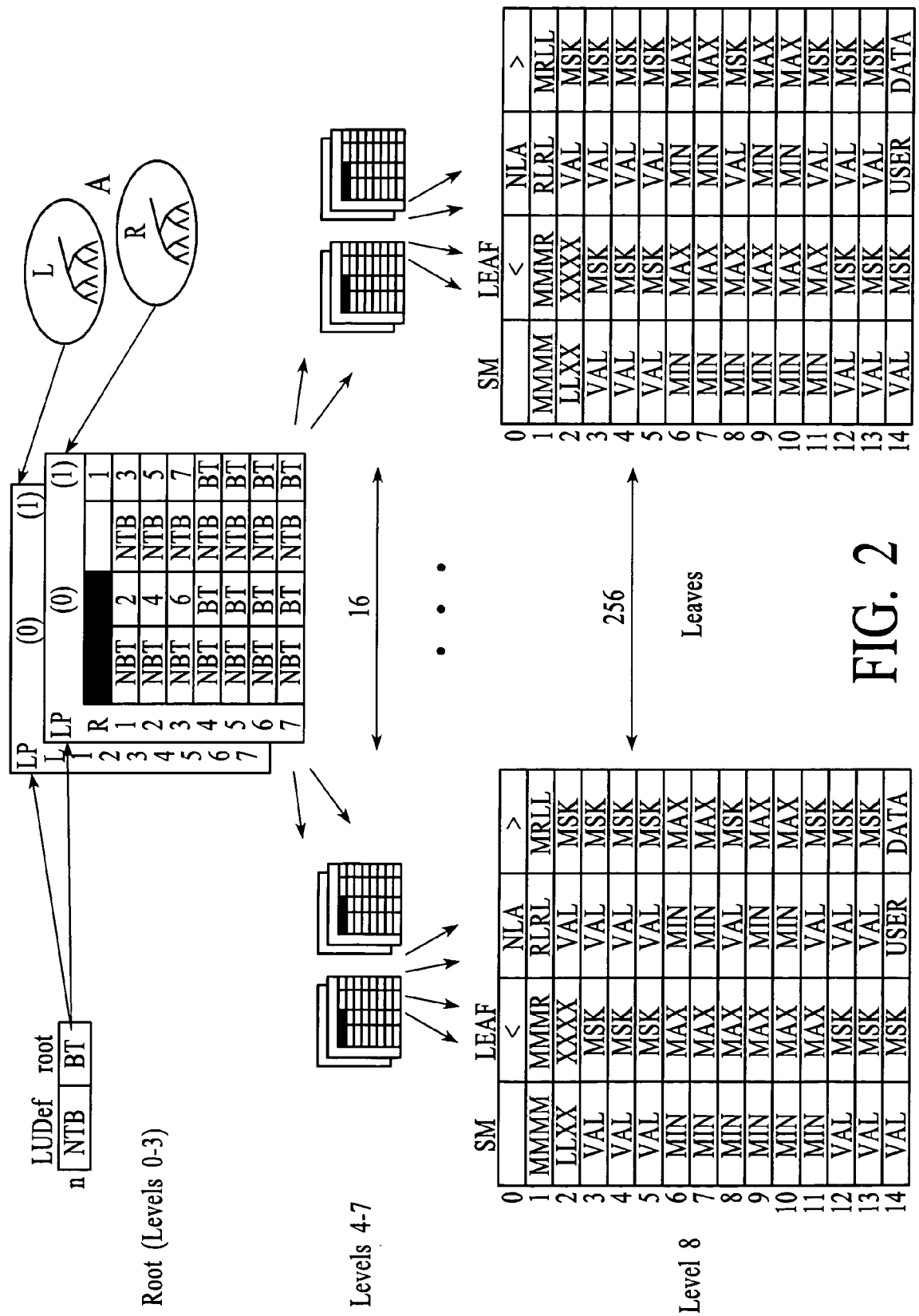
FIG. 2 illustrates a search tree structure of PSCBs in accordance with the present invention.

FIG. 2 illustrates a search tree structure of PSCBs in accordance with the present invention and described in co-pending U.S. patent application, filed on Nov. 22, 2002, Ser. No. 10/065,819 and incorporated herein by reference in its entirety. By way of example, a search of the tree in FIG. 2 begins with the memory access request of the left or right half of the Root or level 0 Branch Table (BT) based on the Next Bit Test (NBT) result from the Lookup Definition (LUDef) or Direct Table (DT, not shown) entry for this search tree. The access of the first branch table half contains multiple levels of PSCBs of the tree optimized for the search type. If after descending through the first table an external (lower) branch table address is arrived at instead of a leaf address, then an additional memory access request would be made for only the left or right half of this lower branch table. This process continues until a leaf address is arrived at during the decent through the lower branch table halves. When the search arrives at a leaf address, the process terminates with a memory access request for the leaf data to determine if a match was found.

Once the tree structure traversal leaf is located by a search, most hardware implementations will compare all of the key bits against the match key found in the leaf, and if a FM was required will report a failure if the key sizes or any key bits are different. If a LPM was required, then if the compare failed, the bit number from left to right of the first difference is returned to be used to select a matching prefix leaf (shorter key) passed during the decent phase of the tree search. If a SMT search was required, then the compare for equal must be modified to ignore the bits that are off in the mask fields (don't cares) and to change the compare to a magnitude range (min to max inclusive) in a number of other user defined fields in the key.

In accordance with the present invention, the comparison of the leaf data has better performance and flexibility with all information for key compare contained in each leaf (i.e., from a single memory reference) to reduce latency for match result. With the present invention, a control structure for leaf compares is provided that includes two major parts, a Control Vector and a Match Key. In order to demonstrate more fully the benefits and features of the control structure of the present invention, reference is made to an example shown in FIG. 3 for an SMT leaf, since for comparison operations, it is the SMT algorithm that is primarily used for complex rules that may contain multiple don't care and/or magnitude range fields and is used to describe policy rules for security and quality-of-service types of applications. In a preferred embodiment, the control vector 2000 contains a 2-bit control setting for each byte of the key to be tested, e.g., 4,8 bits total for the 192-bit key (24 byte) implementation shown. These control settings are used to control the type of compare tests to be performed on each byte of the match key 2002.

The control settings along with the appropriate high (max) and low (min) bytes of the match key 2002 are processed from left to right so that magnitude comparisons of longer (L) ranges can be enabled by the compare results from the left or higher order bytes of the multi-byte range. The left most byte of a range compare is indicated by the Range (R) control setting and is then not dependent on the key byte to the left to enable the magnitude comparison. For simple masked (don't care) comparisons for equality the Mask (M) control setting is used and then the high and low match key bytes are used for the msk and val bytes respectively. The end of the match key is indicated by filling the rest of the control vector settings with the Exit or Stop (x) value. In addition to terminating the comparison process for either a stop control or the maximum key length, the comparison may be terminated at the first failing byte of the key being tested.

Figure 3:
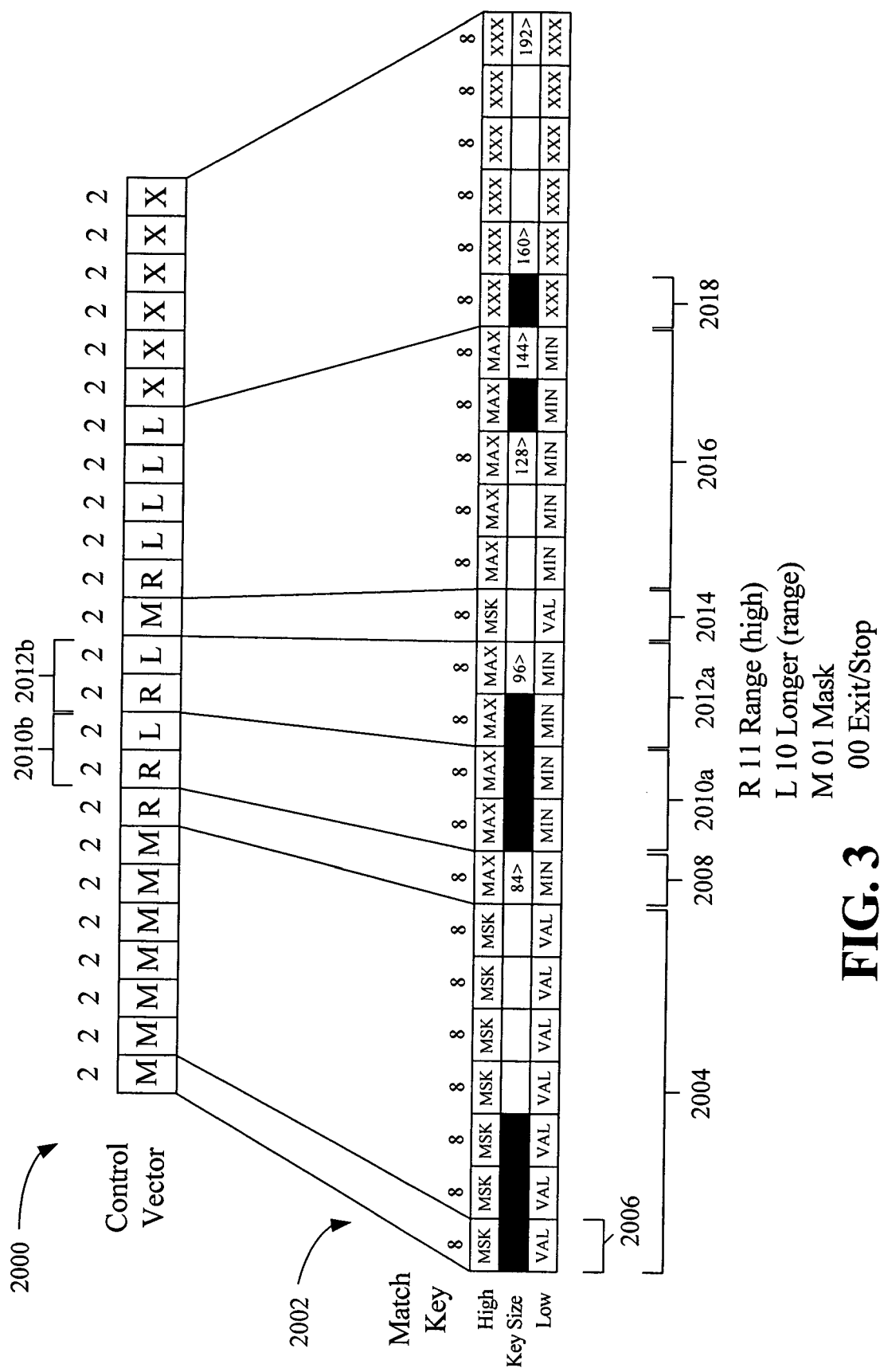
FIG. 3 illustrates an example of a leaf data control structure in accordance with the present invention for a SMT algorithm.

In the example shown in FIG. 3, the leftmost seven bytes, labeled 2004, of the 144-bit match key 2002 are defined as a masked compare (M control setting), in which the leftmost byte corresponds to byte 2006 of the match key 2002. This is followed by an 8-bit range field, 2008, defined by the R control setting, which is then followed by two 16-bit range fields, 2010a and 2012a, each defined by the pairing of the R and L control setting, 2010b and 2012b. These ranges are then followed by an 8-bit mask field 2014 and then a 40-bit range 2016 which is indicated by the R followed by four Ls in the control vector 2000. This last range is then followed by Xs to fill out the rest of the 192-bit control vector which indicates the end of this rule. in which the left most byte corresponds to byte 2018 of the The layout of this same example is shown in the SMT Leaf diagram of FIG. 4. The control vector 2000 is contained in the six bytes shown as containing MMMM, MMMR, RLRL, MRLL, LLXX, and XXXX with their corresponding match key values indicated in correspondence with FIG. 3. As shown, within the leaf following the control vector data and match key data, there is area available for additional data, like hash and encryption keys, sequence numbers, headers, protocols, etc., and as shown in the diagram, the portion of the match key space that is not required for a leafs rule definition (XXXs) may be allocated as space for other additional data.

Application of the control structure and match key format to the FM and LPM leaf control blocks is shown in the FM/LPM leaf diagram of FIG. 5. The Last Bit Tested (LBT) control byte 2020 indicates the right most bit of the match key (VALs) to be used for comparison, assuming the key is numbered from left to right and starts with zero. As in the SMT leaf block of FIG. 3, there is area available for additional data, and the portion of the match key space that is not required for a leafs rule definition (XXXs) may be allocated as space for other additional data.

Figure 6:
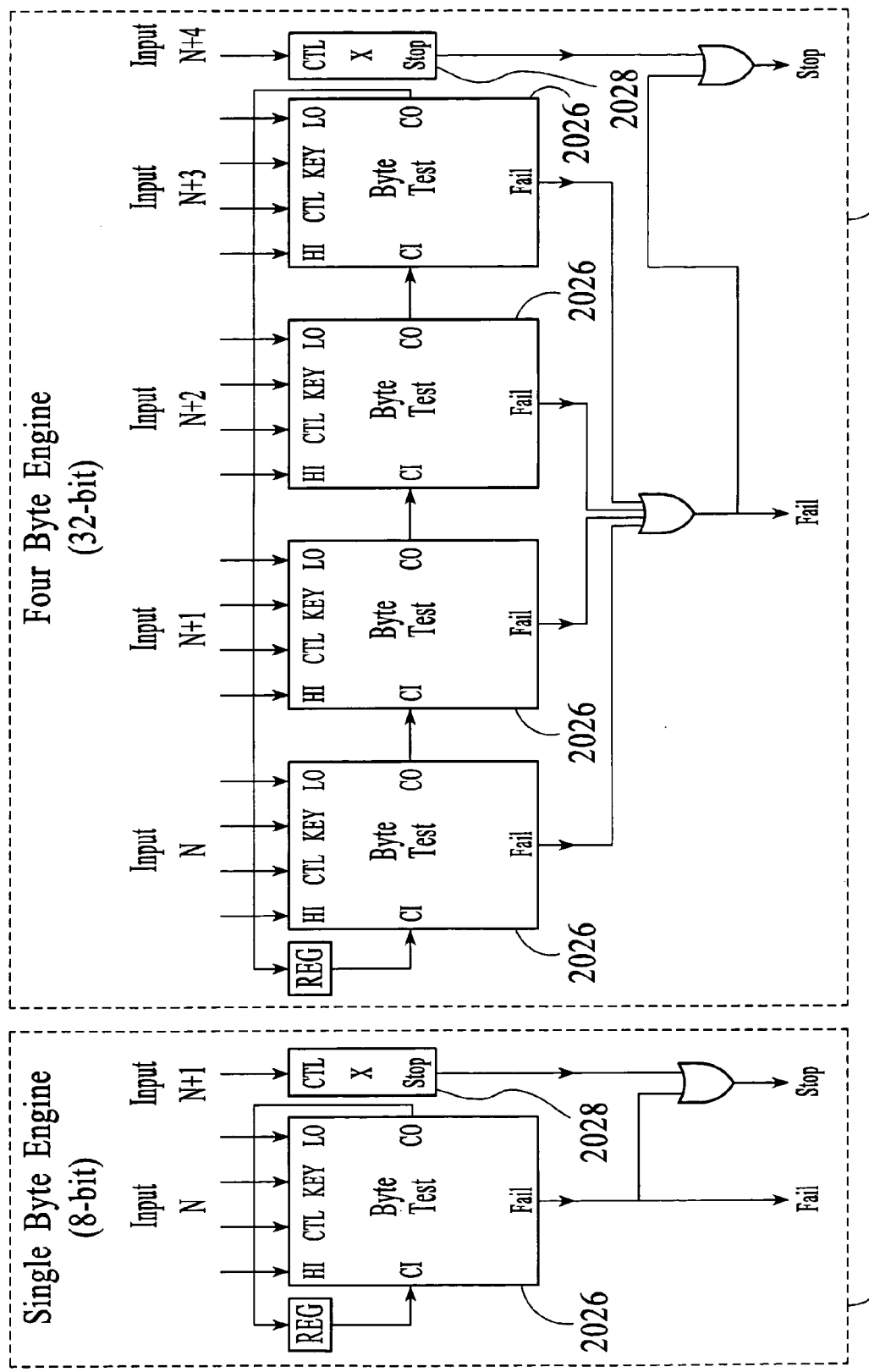
FIG. 6 illustrates a block diagram of key compare engines in accordance with the present invention.

With the SMT leaf's left to right and per byte approach to the control settings, a compare engine may be implemented in which any number of bytes of the key compare may be processed during a clock cycle. FIG. 6 contains the block diagrams of key compare engines for both single and four byte examples. It should be obvious from the four byte example that an engine of almost any width can be constructed, based only on the required performance (number of clocks) of the key compare versus the space, power and timing budget available for the engine. The example 144-bit rule of FIG. 3 would require 18 clock cycles to complete on the single byte engine shown in block 2022, 9 clocks on a two byte engine (not shown), 6 clocks on a three byte engine (also not shown), and 5 clocks on the four byte engine shown in block 2024. Each of the BYTE TEST box 2026 and X box 2028 of both block diagrams 2022 and 2024 in FIG. 6 contain the appropriate logic to implement the following equations for the internal and output signals, as is well appreciated by those skilled in the art, where "&" refers to logical AND and "x ? y: z" refers to conditional select and reads as if x then y else z . . .

BYTE TEST Internal:
mask=(ctl==M) ? hi: 0xFF;
above=key>hi;
hi_eq key==hi;
lo_eq=(key & mask)==(lo & mask)
below =key<lo;
hi<=max, msk
lo<=min, val
BYTE TEST Outputs:
hi_co=(ctl==L) ? hi_ci & hi_eq:
(ctl==R) ? hi_eq: 0;
lo_co=(ctl==L) ? lo_ci & lo_eq:
(ctl==R) ? lo_eq: 0;
fail=(ctl==M) ? ~lo_eq:
(ctl==L) ? (hi_ci & above) or (lo_ci & below):
(ctl==R) ? (above or below): 0;
X Output:
stop=(ctl==X):

As can be seen in the equations, only the output signals of the BYTE TEST box 2026 are dependent on the inputs from the byte to the left and then only if the control setting is L. The total per clock time delay of this left to right dependence will put a limit on the maximum width of the engine.

Based on the cost versus performance approach for the SMT key compare engine, it should be obvious that a similar, incremental implementation would be appropriate for the FM/LPM compare engine, although a different width exclusive-or and priority encoder may be required to meet higher performance requirements, as is well appreciated by those skilled in the art.

In accordance with the leaf structure of the present invention, every SMT leaf can contain different mask and range field definitions. Further, SMT ranges from 1 to all bytes of key, and no separate range table is required in hardware for performance. Thus, the leaf structure of the present invention provides a straightforward and efficient approach for improving leaf comparison operations of a tree search engine.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemted method for performing read/write access of data stored in a leaf of a tree structure within an external memory of an embedded processing system, the method comprising:
   providing a control structure for the leaf of the tree structure, the control structure including a control vector and a match key, the control vector indicating a type of comparison test to be performed on the match key;
   storing the control structure including the control vector and the match key within the leaf of the tree structure;
   processing an input key pattern to locate the leaf of the tree structure by performing the type of comparison test indicated by the stored control vector between the input key pattern and the match key; and
   accessing the data stored in the leaf of the tree structure to perform a read or write responsive to the input key pattern matching the input key pattern in accordance with the performed comparison test.

2. The method of claim 1, wherein the control vector further comprises a control setting that indicates a type of comparison test to be performed on a pre-determined portion of the match key.

3. The method of claim 2, wherein the control setting further comprises a two-bit value that indicates a type of comparison test to be performed on a byte of the match key.

4. The method of claim 2, wherein providing a control structure comprises providing the control structure in a fixed size block of memory.

5. The method of claim 4, further comprising storing additional data in the fixed size block of memory following the control structure.

6. The method of claim 2, wherein the control vector further comprises a control setting to indicate a masked compare test is to be performed, a masked compare test being a don't care comparison test.

7. The method of claim 6, wherein the match key further comprises a mask pattern and key value for the masked compare test.

8. The method of claim 2, wherein the control vector further comprises a control setting to indicated a range compare test is to be performed, a range compare test being a comparison test that matches a value to a pre-determined range of values.

9. The method of claim 8, wherein the match key further comprises maximum and minimum values of the pre-determined range of values for the range compare test.

10. A system comprising:
    an external memory storing data in a leaf of a tree structure within the external memory, the leaf containing a match key and a control vector, the control vector indicating a type of comparison test to be performed on the match key for accessing the date stored in the leaf;
    an embedded processing system coupled to the external memory, the embedded processing system including a tree search engine to process an input key pattern to locate the leaf within the tree structure of the external memory by performing the type of comparison test indicated by the stored control vector between the input key pattern and the match key; and
    the tree search engine accessing the data stored in the leaf of the tree structure for performing a read or write responsive to the input key pattern matching the input key pattern in accordance with the performed comparison test.

11. The system of claim 10, wherein the control vector further comprises a control setting that indicated a type of comparison test to be performed on a pre-determined portion of the match key.

12. The system of claim 11, wherein the control setting further comprises a two-bit value that indicates a type of comparison test to be performed on a byte of the match key.

13. The system of claim 10, wherein the external memory comprises fixed sized blocks for storing control structure.

14. The system of claim 13, wherein the external memory further stores additional data in the fixed size block of memory following the control structure.

15. The system of claim 11, wherein the control vector further comprises a control setting to indicate a masked compare test is to be performed, a masked compare test being a don't care comparison test.

16. The system of claim 15, wherein the match key further comprises a mask pattern and key value for the masked compare test.

17. The system of claim 11, wherein the control vector further comprises a control setting to indicate a range compare test is to be performed, a range compare test being a comparison test that matches a value to a pre-determined range of values.

18. The system of claim 17, wherein the match key further comprises maximum and minimum value of the pre-determined range of values for the range compare test.

19. A computer readable medium containing program instructions tangibly stored thereon for performing read/write access of data stored in a leaf of a tree structure within an external memory of an embedded processing system, the program instructions comprising instructions to:

provide a control structure for the leaf of the tree structure, the control structure including a control vector and a match key, the control vector indicating a type of comparison test to be performed on the match key;

store the control structure including the control vector and the match key within the leaf of the tree structure;

process an input key pattern to located the leaf of the tree structure by performing the type of comparison test indicated by the stored control vector between the input key pattern and the match key; and access the data stored in the leaf of the tree structure to perform a read or write responsive to the input key pattern match the input key pattern in accordance with the performed comparison test.

20. The computer readable medium of claim 19, wherein the control vector further comprises a control setting that indicates a type of comparison test to be performed on a pre-determined portion of the match key.

21. The computer readable medium of claim 20, wherein the control setting further comprises a two-bit value that indicates a type of comparison test to be performed on a byte of the match key.

22. The computer readable medium of claim 20, wherein the instructions to provide a control structure comprise instructions to provide the control structure in a fixed size block of memory.

23. The computer readable medium of claim 22, further comprising instructions to store additional data in the fixed size block of memory following the control structure.

24. The computer readable medium of claim 20 wherein the control vector further comprises a control setting to indicate a masked compare test is to be performed, a masked compare test being a don't care comparison test.

25. The computer readable medium of claim 24, wherein the match key further comprises a mask pattern and key value for the masked compare test.

26. The computer readable medium of claim 20, wherein the control vector further comprises a control setting to indicate a range compare test is to be performed, a range compare test being a comparison test that matches a value to a pre-determined range of values.

* * * * *